Dec. 15, 1925.  1,565,427
F. C. DIXON
SAW ATTACHMENT FOR TRACTORS
Filed May 4, 1925
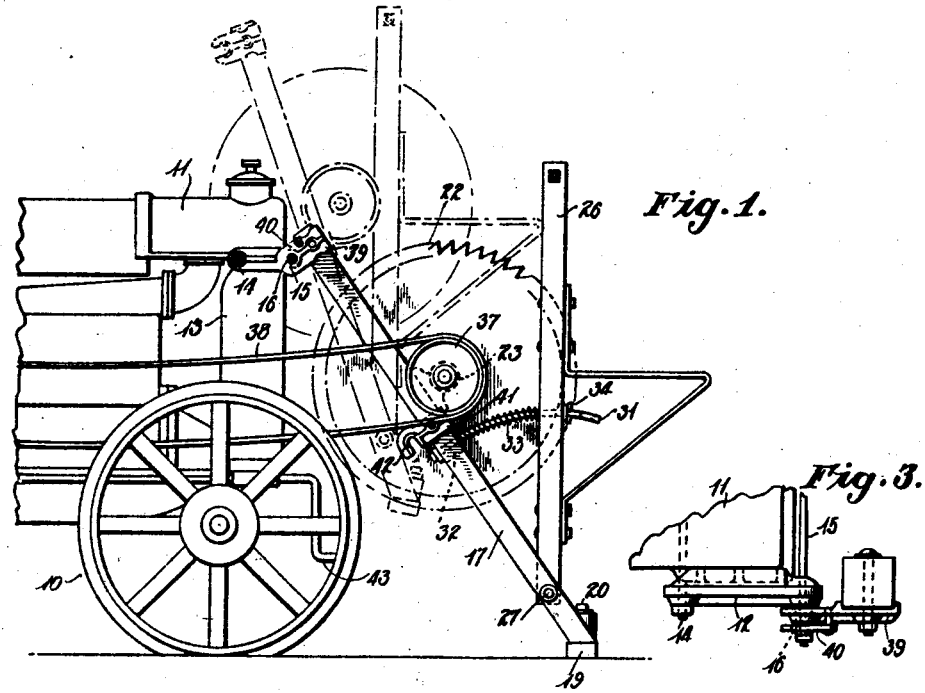
Fig. 1.
Fig. 3.
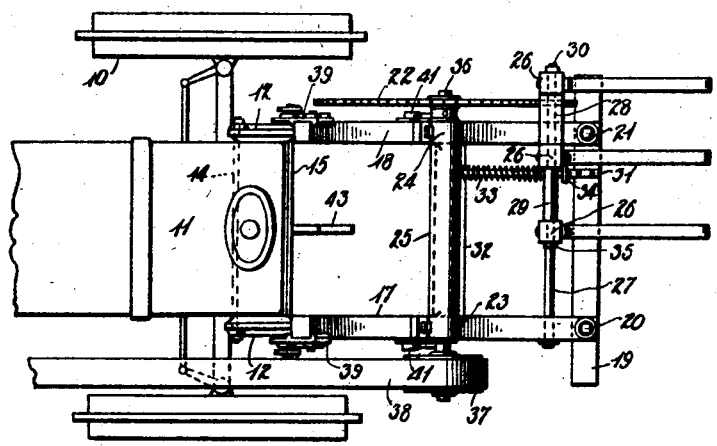
Fig. 2.
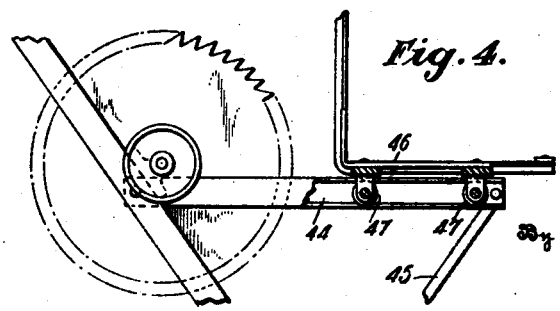
Fig. 4.
Inventor
F. C. Dixon
Attorneys Patented Dec. 15, 1925.

1,565,427

UNITED STATES PATENT OFFICE.

FRANK C. DIXON, OF WINONA, MINNESOTA.

SAW ATTACHMENT FOR TRACTORS.

Application filed May 4, 1925. Serial No. 27,930.

*To all whom it may concern:*

Be it known that I, FRANK C. DIXON, a citizen of the United States, residing at Winona, in the county of Winona and State of Minnesota, have invented certain new and useful Improvements in Saw Attachments for Tractors, of which the following is a specification.

The invention relates to saw attachments and has as an object the provision of a saw frame in the form of an attachment to a tractor.

It is an object of the invention to provide such an attachment which rests upon the ground while in use, whereby to avoid a large portion of the strain and vibration of the tractor and yet may be moved to a position supported by the tractor for transportation in an exceedingly short space of time.

It is a further object of the invention to provide an attachment of the character described, which may be attached to a tractor with great readiness without any change in the structure of the tractor.

It is a further object of the invention to provide an attachment for a tractor, which is able to saw wood for fuel or into fence posts or other purposes when a cross-cut saw may be used.

It is a further object of the invention to provide a tractor attachment for sawing purposes, which can be placed in position for transportation upon the tractor without removal of the driving means for operation of the attachment.

Further objects of the invention will appear from the following description when read in connection with the accompanying drawing showing an illustrative embodiment of the invention, wherein—

Fig. 1 is a side elevation showing the attachment applied to a tractor, and dotted lines showing the same in position for transportation;

Fig. 2 is a plan view of the structure shown in Fig. 1;

Fig. 3 is a detail plan view of the means for attaching the device to the radiator of a tractor;

Fig. 4 is a detail side elevation, partly in section, of a sliding table applied to the attachment.

As shown in Fig. 1, the front wheel of a tractor is shown at 10, and the radiator thereof at 11. For purposes of attaching the device provided by the invention to the tractor, a pair of plates 12, shown in plan view in Fig. 3, are secured one at each side of the radiator shell 13, as by means of bolts 14—15, extending transversely of the radiator shell.

The front ends of the plates 12 are shown as formed with a hollow projecting stud 16, through which the bolt 15 extends, and which stud serves as a journal or lug to receive the hooks carried by the attachment.

The attachment is shown as comprising a pair of spaced parallel main members 17—18, which, in position for use, are inclined as shown in Fig. 1, and which are connected at their lower ends by means of a shoe 19, secured thereto by means of bolts 20—21.

To carry a saw blade 22, of the circular variety, there are shown journal bearings 23—24, preferably formed integrally with a solid connecting member 25, extending between the members 17—18, whereby to preserve the true alignment of the journal bearings.

The operative parts of the attachment are completed by means of a swinging frame comprising uprights 26, shown as pivoted at their lower ends upon a rod 27. The upper ends of two of the members 26 are shown as separated by a spacer 28, and between the remaining two there is shown a handle 29. A bolt 30 is shown as passed through the spacer 28 and the handle 29, and as clamping the upper ends of the swinging frame together.

To retain the swinging frame in a normal position in advance of the teeth of the saw, a guide rod 31 is shown springing from a cross member 32 secured between the main members 17—18.

A spring 33, acting in compression, returning table to natural position is shown surrounding the rod 31 and pressing an upright of the frame to normal position against a stop 34 carried by the rod. The guide rod is shown as formed in the arc of a circle having its center at the axis rod 27. The rod 27 is shown as provided with a collar 35 to prevent lateral movement of the swinging frame.

The arbor or drive shaft 36 of the saw is shown as carrying a pulley 37, about which a belt 38 passes, which belt may lead to the usual drive pulley carried by the tractor.

To retain the frame in its relation to the plates 12 while in use, the upper end of the frame is shown as carrying members 39 bolted thereto, each member having a slot opening from its end to drop over the lugs 16. A hook 40 is shown pivoted to each member 39, which hook drops over the lug 16 as shown in Fig. 1 to lock the frame to the tractor during use.

To support the attachment in position for transportation, plates 41 are shown secured to the side members 17—18 at their approximate centers, each plate terminating in a downwardly-opening hook 42. When it is desired to transport the attachment, the hooks 40 may be raised, the attachment being swung upwardly to the dotted line position when the hooks 42 will receive the lugs 16, and the attachment will be carried and retained in the dotted line position by gravity. It will be seen that the crank of the tractor 43 is accessible in both positions of the attachment.

The belt 38 may be readily removed from tractor pulley during transportation of the attachment and when the attachment is returned to its operating position, after moving of the tractor, the belt will be automatically tightened to operating condition by the mere return of the attachment to the position shown in Fig. 1 after the belt is replaced on the pulley. If it is desired to tighten the belt a stick or plank may be placed upon the ground under the shoe 19, increasing the distance between the pulleys.

A different form of table is shown in Fig. 4, comprising horizontal members 44 and brace members 45, which may be made to replace the swinging frame shown in Fig. 1. This attachment is shown as carrying a sliding table 46 and is preferably made of channel iron with the wheels 47 traveling upon the flanges thereof.

The entire device may be made of either wood or structural steel, as preferred, and may readily be made to accommodate and operate a saw as large as thirty-six inches in diameter when used with tractors of usual farm size.

Since the attachment is supported largely by the ground, any vibration of the tractor is minimized in its effect upon the attachment.

Minor changes may be made in the physical embodiment of the invention without departing from the spirit thereof.

I claim:

1. A sawing attachment comprising plates adapted to be clamped to the radiator of a tractor, said plates having bosses projecting therefrom, a frame having means adjacent its upper end comprising outwardly open jaws to engage said bosses and adapted to rest at its lower end upon the ground, a shaft journaled upon said frame, a saw mounted upon said shaft, driving means carried by said shaft adapted to be driven by the tractor, and movable means mounted upon the frame to carry material to be cut by said saw.

2. A sawing attachment comprising, in combination, means adapted to be clamped to the radiator of a tractor and carrying projecting bosses, a frame having means at its upper end for detachable engagement with said bosses, means adjacent the center of the frame also adapted for detachable connection with said bosses, whereby to hold the device suspended from said tractor for transportation, said frame adapted to rest upon the ground in operative position, a shaft journaled on said frame, a saw carried by said shaft, driving means carried by said shaft adapted to be driven from the tractor, and a movable work-supporting means mounted upon the frame to carry material to be cut by said saw.

FRANK C. DIXON.